United States Patent [19]

Sakata et al.

[11] 3,966,665

[45] June 29, 1976

[54] COATING COMPOSITION FOR HARDENING THE SURFACE OF CELLULOSIC PLASTICS AND SHAPED ARTICLES OF CELLULOSIC PLASTICS USING SAID COATING COMPOSITION

[75] Inventors: Nobuhiro Sakata, Ashiya; Toshihiro Suzuki, Yokohama, both of Japan

[73] Assignees: Nippon Pelnox Corporation; Nippon Sheet Glass Co., Ltd, both of Japan

[22] Filed: Apr. 10, 1974

[21] Appl. No.: 459,851

[30]   Foreign Application Priority Data
Apr. 13, 1973   Japan.............................. 48-42421

[52] U.S. Cl........................ 260/32.8 R; 260/17.3; 260/33.2 R; 260/33.4 R; 260/67.6 R; 260/849
[51] Int. Cl.².......................................... C08G 12/32
[58] Field of Search.......... 260/67.6 R, 849, 32.8 R, 260/33.2 R, 33.4 R

[56]           References Cited
           UNITED STATES PATENTS

| | | | |
|---|---|---|---|
| 3,135,707 | 6/1964 | Nyquist............................. | 260/849 |
| 3,267,174 | 8/1966 | Fry et al............................ | 260/851 |
| 3,352,806 | 11/1967 | Hicks................................. | 260/856 |
| 3,352,838 | 11/1967 | Toepfl et al....................... | 260/856 |
| 3,422,046 | 1/1969 | Thomas et al..................... | 260/849 |
| 3,523,093 | 8/1970 | Stamberger....................... | 260/849 |
| 3,542,718 | 11/1970 | Davis et al........................ | 260/849 |
| 3,626,023 | 12/1971 | Brizgys............................. | 260/849 |

*Primary Examiner*—John C. Bleutge
*Attorney, Agent, or Firm*—Wenderoth, Lind & Ponack

[57]           ABSTRACT

A surface hardening coating composition for cellulosic plastics, comprising as a hardening component a mixture consisting of (a) methylolmelamine with at least part of its methylol groups optionally alkyl-etherified and (b) 0.1 to 1.5 equivalents, per equivalent of the methylolmelamine, of an aliphatic or alicyclic compound having at least two functional groups capable of reacting with the methylol groups or alkyl ethers thereof, and/or a precondensation product between the components (a) and (b). Shaped articles of cellulosic plastics having superior abrasion resistance and flexibility can be prepared by coating the surface of a shaped article of cellulosic plastics with the above composition and baking the coated article at a temperature from 60°C. to the heat distortion temperature of the article.

5 Claims, No Drawings

COATING COMPOSITION FOR HARDENING THE SURFACE OF CELLULOSIC PLASTICS AND SHAPED ARTICLES OF CELLULOSIC PLASTICS USING SAID COATING COMPOSITION

This invention relates to a coating composition for hardening the surface of cellulosic plastics. More specifically, it relates to a surface hardening coating composition based on methylolmelamine capable of imparting increased abrasion resistance to the surface of the plastics, and also to shaped articles of cellulosic plastics having superior abrasion resistance and flexibility which are obtained by using the above coating composition.

Generally, shaped articles of thermoplastic polymers have the defect that because of their poor abrasion resistance, their surfaces are liable to undergo injury even by weak friction. With a view to remedying this defect, it has been the general practice to coat the surfaces of such shaped articles with various thermosetting plastics such as thermosetting acrylic resins, polyester resins, or melamine resins. Since, however, the setting temperatures of these resins are too high, the application of these resins to the surface of a shaped article of cellulosic plastics results in the deformation of the shaped article. Even when the coating and curing of the above resin to the surface of the cellulosic plastic article becomes possible at low temperatures as a result of, for example, using a curing catalyst, the poor flexibility of the coating may bring about various defects when reshaping the cellulosic plastic articles coated with such resins or when the shaped articles are swollen or shrunken during use. For example, cracks occur in the coated resin layer or the coated resin layer separates from the surface of the article.

An object of this invention is to provide a coating composition for hardening the surface of cellulosic plastics, which is free from these defects of the prior art.

Another object of this invention is to provide a shaped article of cellulosic plastics coated with the coating composition and having superior abrasion resistance and surface flexibility.

It has been found that the above objects of this invention can be achieved by using a melamine resin modified with an aliphatic or alicyclic compound having at least two reactive functional groups as a surface coating material.

According to this invention, there is provided a surface hardening coating composition for cellulosic plastics, said composition comprising as a hardening ingredient a mixture of (a) methylolmelamine wherein at least some of the methylol groups are optionally alkyl-etherified and (b) 0.1 to 1.5 equivalents, per equivalent of said methylolmelamine, of an aliphatic or alicyclic compound having at least two functional groups capable of reacting with the methylol groups of said methylolmelamine or their alkyl ethers, and/or a precondensation products of said components (a) and (b).

The use of the coating composition of this invention makes it possible to reduce the hardening temperature of the coated film. For example, in the presence of catalyst, the coated layer can be hardened by baking at 70°C. for 40 minutes. This is probably because a crosslinking reaction among the low-reactive methylol groups of the methylolmelamine is superseded by a crosslinking reaction among the functional groups of the modifying component (b) mentioned above.

The coated film on the surface of cellulosic plastics obtained by using the coating composition of this invention has superior abrasion resistance ascribable to the melamine resin, and superior flexibility as a result of introducing the modifying component (b), and is commercially satisfactory since unlike the conventional surface hardening agents, the formation of cracks or the separation from the surface of the article is not caused by the reshaping of the coated article or temperature cycle. This superior advantage is probably ascribed to the mechanism whereby the aliphatic or alicyclic compound (modifying component (b)) which has reacted with the methylolmelamine or its alkyl ether extends the cross-linked chain between triazine rings, and/or forms side chains to act as an internal plasticizer for the modified melamine resin. This is in contrast to the case of using methylolmelamine alone in which a triazine ring is connected to an adjacent triazine ring by a short crosslinked chain to form a melamine resin.

The methylolmelamine used in this invention is a compound wherein at least part of the hydrogen atoms of three amino groups ($-NH_2$) bonded to the triazine ring are replaced by methylol groups ($-CH_2OH$). The number of methylol substituents can be varied according to the desired degrees of the hardness and flexibility of the resulting coated layer, but is generally 3 to 6, preferably 5 to 6.

The methylol groups may be alkyl-etherified. It is not necessary that all of the methylol substituents should be alkyl-etherified, but methylolmelamine compounds in which some of the existing methylol groups are alkyl-etherified can also be used in this invention. The degree of alkyl-etherification differs according to the aliphatic or alicyclic compound to be used as the component (b), but in order to avoid the self-condensation of methylolmelamine before use, it is preferred to alkyl-etherify all or greater part of the existing methylol groups.

The alkyl moiety of the alkyl-etherified methylol may have 1 to 6 carbon atoms, preferably 1 to 3 carbon atoms, and may be of straight chain or branched chain. Examples of the alkyl moiety are methyl, ethyl, n- or iso-propyl, and n-, iso-, or tert.-butyl groups.

Typical examples of methylolmalamine optionally alkyl-etherified are trimethylolmelamine, tetramethylolmelamine, pentamethylolmelamine, hexamethylolmelamine, pentamethylolmelamine tributyl ether, hexamethylol-melamine triethyl ether, tetramethylolmelamine tetramethyl ether, and hexakismethoxymethylmalamine.

In the polycondensation of the methylolmelamine (component (a)), an aliphatic or alicyclic compound having at least 2 functional groups (component (b)) which acts as an extender for crosslinked chains and/or a side chain forming agent can be incorporated.

The functional groups may be any groups which have the property of reacting with the methylol groups or alkyl ethers thereof of the component (a), and preferably include hydroxyl, amino and carboxyl groups. In the case of amino groups, alkyl-etherified methylol groups are difficult to react, and therefore, the use of methylolmelamines having free methylol groups is preferred.

There is no particular limitation on these functional groups, and it is sufficient that at least two such functional groups are present in one molecule, and furthermore, the functional groups may be the same or different in kind.

The base component to which the functional groups are attached may be aliphatic compounds, for example, alkanes which may contain heteroatoms such as nitrogen, oxygen or sulfur atoms, or may be alicyclic compounds such as cyclo-alkanes containing 6 to 12 atoms such as carbon, nitrogen, oxygen and sulfur atoms. The aliphatic compounds may contain side chains or substituents which do not participate in the reaction. The alicyclic compounds can also contain optional substituents that do not participate in the reaction.

The aliphatic compound may also be a polymeric substance.

The molecular weight of the aliphatic or alicyclic compound is not critical and can be varied over a wide range, so long as it reacts with the methylolmelamine to provide a modified melamine resin having a combination of the required hardness and flexibility. However, if the modifying component (b) has too high a molecular weight, the reactivity of the functional groups is reduced, and curing at low temperatures becomes difficult, and moreover, the distance between triazine rings becomes too wide to obtain sufficient hardness. Accordingly, the molecular weight of the modifying component (b) is generally not more than 300, usually about 70 to 200.

In the case of aliphatic compounds, it is not preferred that the adjoining functional groups are apart from each other by a long distance; but it is usually desirable that these functional groups should be spaced from each other by 2 to 8 atoms such as carbon, nitrogen, oxygen and sulfur atoms.

Examples of suitable aliphatic or alicyclic compounds having at least two functional groups used as the component (b) in this invention are aliphatic or alicyclic polyols, polyamines, polycarboxylic acids, oxy acids, organic amino alcohols, and amino acids. The polyols are especially advantageous.

Some typical examples of the aliphatic or alicyclic compounds conveniently used in this invention are as follows:

1. Polyols

The polyols used in this invention are monomers, or oligomers resulting from the polymerization of two to four such monomers. Specific examples include ethylene glycol, diethylene glycol, triethylene glycol, propylene glycol, 1,3- or 1,2-propanediol, 1,2-, 1,3-, 1,4-, or 2,3-butanediol, 1,2- or 1,8-octanediol, sorbitol, polyethylene glycol, polypropylene glycol, ethylene glycol/propylene glycol copolymer, glycerol, digitoxose, and phloroglucitol. Of these polyols, ethylene glycol is most suitable for obtaining superior hardness in particular, and diethylene glycol is most suitable for obtaining superior flexibility in particular, both in view of the compatibility and reactivity with methylolmelamine which may be optionally alkyl-etherified.

2. Organic polyamines

Examples are ethylenediamine, triethylenetetramine, propylenediamine, 1,3-diaminopropane, iminobispropylamine, tetramethylenediamine, and hexamethylenediamine. These organic polyamines have poor compatibility with methylolmelamine, and therefore, are desirably used in the form of precondensate. Especially preferred polyamines are tetramethylenediamine and hexamethylenediamine.

3. Organic polycarboxylic acid

Since organic polycarboxylic acids generally have poor compatibility with methylolmelamine, it is preferred to use them in the form of precondensate. Suitable examples include oxalic acid, malonic acid, succinic acid, glutaric acid, adipic acid, pimelic acid, maleic acid, suberic acid, tricarballylic acid, fumaric acid, hexahydrophthalic acid, and camphoric acid. In view of the balance of the desired hardness and flexibilty of the coated layer, adipic acid, pimelic acid and suberic acid are especially preferred.

4. Organic oxy acids

Examples are β-hydroxybutyric acid, gluconic acid, tartronic acid, citric acid, and lactic acid.

5. Organic amino alcohols

Examples are monoethanolamine, aminoethyl ethanolamine, monoisopropanolamine, butylethanolamine, and methylethanol amine.

6. Organic amino acids

Glycine, alanine, valine, glutamic acid, glutamine, or ornithine, for example, can be advantageously used.

The modifying component (b) functions as a cross-linking component at the time of polycondensation of methylollamine, and the increased amount of the modifying component (b) leads to an increase in the flexibility of the resulting coated layer and the increased rate of curing reaction. But on the other hand, this causes a decrease in the proportion of the triazine rings in the resulting coated film, and the hardness decreases. It is therefore not desirable to incorporate too much modifying component (b).

If the amount of the modifying component (b) is excessive, the unreacted modifying component (b) not participating in the cross-linking reaction remains in the coated layer, and the hardness and durability of the coated layer decrease. In this case, the maximum amount in which the unreacted modifying component (b) does not remain, is determined by the number of methylol groups or alkyl ethers thereof of the methylolmalamine.

If the amount of the modifying component (b) is too small, it is impossible to widen the distance between the triazine rings by means of the modifying component (b), and a coated layer having flexibility cannot be obtained. Moreover, the reactivity cannot be increased.

For this reason, the amount of the modifying component (b) is such that 0.1 to 1.5 (that is, 0.1 to 1.5 equivalents) functional groups are present in the modifying component per methylol group (per equivalent of methylol group) or its alkyl ether present in the methylolmelamine. The suitable amount of the modifying component (b) varies within the above range according to its type, the number of its functional groups, the number of methylol groups or their alkyl ethers in the methylolmelamine, and the balance of the abrasion resistance and the flexibility of the final coated layer. It can be easily determined by those skilled in the art. Generally, the amount of the modifying component (b) is advantageously 0.8 to 1.2 equivalents per equivalent of methylol group or its alkyl ether.

Since the basic concept of this invention is that in order to impart flexibility to a melamine resin, the methylolmelamine (a) is reacted with the modifying component (b) to form a modified melamine resin, it will be readily understood that the coating composition may be one obtained by mixing the methylolmelamine component (a) or its alkyl ether with the modifying component (b) having at least two functional groups, and pre-condensing the mixture. When a precondensation product is used, it is desirably soluble in a diluent used for coating the product on the surface of a cellulosic plastic article. In view of the ease of viscosity control and the adhesion of the cured coating, it is desirable to use those precondensates which have a molecular weight of up to about 100,000. In this case, the methylolmelamine or its alkyl ether is not reacted with the modifying component (b) after coating, but these components are pre-condensed with stirring in a reactor. Accordingly, it is not especially necessary to consider the compatibility of the methylolmelamine with the modifying component (b).

When the precondensate is used as a coating composition, methylolmelamine and/or modifying component (b) may further be added to the pre-condensate. Alternatively, a part of the mixture of the methylolmelamine (a) and the modifying component (b) can be replaced by the above precondensate.

The coating composition of this invention may be a powder or bulk, or a solution or dispersion in a diluent. In the case of the former, a suitable diluent may be added prior to use to form a liquid composition. In the latter case, the composition can be used either as such or after further adding a diluent to control its viscosity.

Suitable diluents are organic solvents which can dissolve or disperse the methylolmelamine component (a) and/or the modifying component (b), and swell, but do not dissolve, cellulosic plastics. Examples include alcohols, such as methanol, ethanol, isopropanol, methyl cellosolve, ethyl cellosolve or butyl cellosolve, esters such as ethyl acetate, isopropyl acetate, or isoamyl acetate, and ketones such as acetone, methyl ethyl ketone or methyl isobutyl ketone.

The composition of this invention may further include an additive such as a pigment or surface conditioner.

The coating composition of this invention as described above can be used for surface hardening coating of cellulosic plastic articles, such as nitrocellulose, cellulose acetate, cellulose propionate, cellulose butyrate or cellulose acetate butyrate.

In order to form a hardened coating on the surface of cellulosic plastics using the composition of this invention, it is first necessary to add a catalyst and a diluent to the mixture of (a) methylolmelamine wherein at least part of the methylol groups may be alkyl-etherified, and (b) 0.1 to 1.5 equivalents, per equivalent of the methylolmelamine, of an aliphatic or alicyclic compound having at least two functional groups capable of reacting with the methylol groups or alkyl ethers thereof, and/or a precondensation product between the components (a) and (b) to prepare a coating composition having a suitable viscosity for coating. The catalyst may be any compounds known as a curing promotor for melamine resins. Suitable catalysts are organic or inorganic acids or ammonium or amine salts thereof, or bases or carbonates thereof. For example, there can be used effectively p-toluenesulfonic acid, nitric acid, hydrochloric acid, ammonium chloride, ammonium p-toluenesulfonate, methylamine hydrochloride, sodium hydroxide, and sodium carbonate. In order to promote the curing reaction further, a promotor such as water may be incorporated as desired. If further desired, an additive such as a pigment or surface conditioner may be added in a small amount.

Thus, there is provided a surface hardening coating composition having a viscosity of about 80 to 400 centipoises.

On the other hand, it is desirable to subject the surface of a cellulosic plastic shaped article to an activating pre-treatment, for example, pre-treatment with acid, alkali, or oxidizing flames in order to increase the adhesion of the coating composition to the surface of the article. After this pre-treatment, the treated surface is washed and dried.

Then, the surface hardening coating composition is applied by an ordinary coating method such as immersion, spraying, roller coating, or flow coating to the pre-treated surface.

After application, the coated layer is baked. The baking temperature differs according to the type of the coating composition used. Generally, it is effective to cure the coating by heating at a temperature of at least 60°C. The upper limit of the baking temperature is below the thermal distortion temperature of the cellulosic plastics.

Generally, the cellulosic plastics have low thermal deformation temperatures, and are usually 80° to 100°C. although varying according to the type of the plastics. Accordingly, it is necessary that the coating composition should be sufficiently cured even at a temperature below the thermal distortion temperature. The composition of this invention can fully meet this requirement.

The "thermal distortion temperature", as used in the present specification and the appended claims, is the lowest temperature at which the apparent distortion of the cellulosic plastic shaped article occurs.

Baking can generally be carried out in a heating oven, and conveniently, the coated article is heated at 75° to 85°C. for about 20 minutes to 3 hours to cure the coated layer.

The use of the composition of this invention makes it possible to form a coated layer having superior abrasion resistance and good adhesion and flexibility without causing heat distortion of the cellulosic plastic shaped article.

The thickness of the coating can be varied according to the purpose of using the shaped article. Generally, the thickness is advantageously 2 to 30 microns, preferably 8 to 20 microns.

It is because of superior heat reshapability that the cellulosic plastic shaped articles are widely used in spite of their softness and poor abrasion resistance. Thus, when the surface hardening coating composition is applied to the surface of a cellulosic plastic shaped article to increase its abrasion resistance, it is especially important to cure the coated layer at a temperature not higher than the thermal distortion temperature of the plastics and not to impair the superior thermal reshapability of the shaped article.

The composition of this invention can give surface coatings having markedly improved abrasion resistance and superior flexibility while meeting the two requirements described above. The composition of this invention can be applied to shaped articles of a wide range of cellulosic plastics such as cellulose acetate, cellulose acetate butyrate, or cellulose propionate of various degrees of esterification. The shaped articles may be in any desired form such as sheet, tube, and sphere.

Thus, by applying the surface hardening coating composition of this invention to the surface of a shaped article of cellulosic plasitcs, the surface hardness of the plastics is increased and superior abrasion resistance is imparted to it. In addition, the based cured coating has good adhesion to the surface of the cellulosic plastic article. Furthermore, since the coated plastic shaped article can be baked and cured at a temperature below the thermal distortion temperature of the plastics, no thermal distortion of the shaped article occurs. The baked and cured coating has superior flexibility which does not impair the flexibility of the shaped plastic article, and therefore, the superior thermal resharpability of the shaped article is not at all hampered. When a cellulose plastic article coated with the coating composition of this invention is further reshaped under heat, no crack is formed on the coated layer, nor the separation of the coated layer occurs.

Furthermore, when the plastic shaped articles coated with the coating composition of this invention is subjected to repeated expansion and shrinkage by change in environmental service conditions, cracking or separation of the coating does not occur.

The plastic shaped articles treated with the coating composition of this invention are useful, for example, for making sun-glasses or protective glasses.

The following Examples illustrate the present invention.

EXAMPLE 1

31 Grams of ethylene glycol was added to 65 g of partially methyl etherified methylolmelamine ($-OC_3 = 67.3\%$, $-CH_2OH = 32.1\%$, $-CH_2- = 0.6\%$), and 2 g of para-toluenesulfonic acid as a catalyst was further added. These compounds are dissolved in 20 g of ethyl cellosolve to form a coating composition. A sheet (80 mm × 100 mm, thickness 0.7 mm) made of cellulose acetate was immersed for 5 minutes in a 2% aqueous solution of sodium hydroxide, washed with distilled water, and then positively dried in the air. The pretreated cellulose acetate sheet was immersed in the coating composition, and then heated in a heating oven at 75°C. for 40 minutes to bake and cure the coating. The cured coating had superior abrasion resistance and superior flexibility, and strongly adhered to the sheet, as shown in Table 1.

EXAMPLE 2

A precondensation product having a molecular weight of about 30,000 (calculated as polystyrene by the GPC method) was prepared from 65 g of hexakismethoxymethylolmelamine and 53 g of diethylene glycol. The precondensation product (60 g) was dissolved in 40 g of ethyl cellosolve, and 2 g of para-toluenesulfonic acid was added as a catalyst. The resulting coating composition was applied to the surface of a cellulose acetate sheet pre-treated with alkali, and baked at 75°C. for 40 minutes to form a coating having superior abrasion resistance, flexibility and adhesion as shown in Table 1.

EXAMPLE 3

65 g of hexakismethoxymethylolmelamine was reacted with 40.5 g of 1,4-butanediol to form a precondensation product having a molecular weight of about 5000. One gram of ethylene glycol was added to 100 g of the precondensation product, and the mixture was dissolved in 40 g of ethyl cellosolve, followed by addition of 3 g of para-toluenesulfonic acid as a catalyst. The resulting coating composition was applied to the surface of a cellulose acetate sheet pre-treated with alkali, and baked at 75°C. for 40 minutes to form a coating having superior abrasion resistance, flexibility and adhesion as shown in Table 1.

The properties of the cured coatings of the cellulose plastic articles obtained in Examples 1 to 3, and comparison coatings formed on the surface of cellulose plastic articles obtained by using a surface hardening treating agent consisting solely of partially methyletherified methylolmelamine and a commercially available surface curing treating agent of the melamine type. The results are shown in Table 1.

Table 1

| Samples | Baking temperature (°C) | Hardness Pencil hardness (1) | Abrasion resistance (minutes)(2) | Flexibility (3) | Adhesion (4) |
|---|---|---|---|---|---|
| Untreated cellulose acetate | — | H–2H | 0.5 | Yes | — |
| Partially methyl-etherified methylolmelamine | 140(5) 100(6) | 4H 2–3H | 30 15 | — Somewhat yes | — Good |
| Commercially available melamine-type coating composition(7) | 85 | 4H | 20 | No | Good |
| Example 1 | 75 | 4H | 25 | Yes | Good |
| Example 2 | 75 | 4H | 30 | Yes | Good |
| Example 3 | 85 | 4H | 20 | Yes | Good |

Note:
(1)The pencil hardness was measured by the method in accordance with JIS K-5400.
(2)The abrasion resistance was measured using a rotary abrading device having an abrading tip of silicone rubber covered with a soft cotton flannel cloth and a circular area of 1 cm². Under a load of 500 g/cm², a locus with a radius of 1 cm was drawn on a sample by the center of the circular tip at a rotating speed of 30 rpm. The time required until there was caused an injury of the same degree as that given to an untreated sample in 30 seconds was measured.

EXAMPLE 4

55 g of pentamethylolmelamine was reacted with 44 g of tetramethylenediamine to form a prepolymer having a molecular weight of about 10,000. 55 g of the precondensation product was dissolved in 45 g of isoamyl acetate, and then 0.5 g of ammonium chloride was added as a catalyst. The resulting coating solution was coated on a sheet of cellulose acetate butyrate pre-treated with alkali, and baked at 80°C. for 40 minutes. The resulting coating had good abrasion resistance, flexibility and adhesion similar to those of the coated at article obtained in Example 3.

EXAMPLE 5

65 g of hexakismethoxymethylmelamine was reacted with 80 g of pimelic acid to form a precondensation product having a molecular weight of about 5000. The prepolymer (60 g) was dissolved in 40 g of methyl cellosolve, and 0.1 g of sodium hydroxide was added as a catalyst. The resulting coating composition was applied to a cellulose diacetate plastic sheet pre-treated with alkali, and baked at 65°C. for 3 hours. The resulting coating had good abrasion resistance, flexibility and adhesion similar to those of the coated article obtained in Example 3.

What we claim is:

1. A surface hardening coating composition for cellulosic plastics, the hardening ingredient of said composition consisting essentially of a pre-condensation product of:

a. methylolmelamine which contains 3 to 6 methylol groups or 3 to 6 methylol groups at least part of which have been converted to an alkyl-etherified methylol group with the alkyl moiety having 1 to 6 carbon atoms and b. 0.8 to 1.2 equivalents, per equivalent of said methylolmelamine, of a polyhydric alcohol which is 1,3-propanediol, 1,4-butanediol or 1,8-octanediol, said pre-condensate having a molecular weight of up to about 100,000.

2. The coating composition of claim 1 wherein 1,4-butanediol is the polyhydric alcohol.

3. The coating composition of claim 1 wherein said composition consists essentially of a powder or bulk of said pre-condensation product.

4. The coating composition of claim 1 wherein said composition consists essentially of a solution or dispersion of said pre-condensation product in a diluent.

5. The coating composition of claim 4 wherein said diluent is a member selected from the group consisting of methanol, ethanol, isopropanol, methyl cellosolve, ethyl cellosolve, butyl cellosolve, ethyl acetate, isopropyl acetate, isoamyl acetate, acetone, methyl ethyl ketone and methyl isobutyl ketone.

* * * * *